United States Patent [19]

Schulz

[11] Patent Number: 5,488,104
[45] Date of Patent: Jan. 30, 1996

[54] PROCESS FOR COMMINUTING CELLULOSE ETHERS

[75] Inventor: Gary J. Schulz, Midland, Mich.

[73] Assignee: The Dow Chemical Company, Midland, Mich.

[21] Appl. No.: 268,402

[22] Filed: Jun. 30, 1994

[51] Int. Cl.$^6$ ............... C08B 11/00; C08B 11/02; C08B 11/20; C08B 11/193
[52] U.S. Cl. ............... 536/86; 536/84; 536/91; 536/99
[58] Field of Search ............... 536/84, 86, 91, 536/99

[56] References Cited

U.S. PATENT DOCUMENTS

| | | | |
|---|---|---|---|
| 2,176,678 | 10/1939 | Neuroth | 536/86 |
| 2,331,864 | 10/1943 | Swinehart et al. | 536/86 |
| 2,331,865 | 10/1943 | Swinehart et al. | 536/86 |
| 2,622,273 | 12/1952 | Detwiler | 18/3 |
| 2,667,482 | 1/1954 | Rigby | 536/86 |
| 2,711,407 | 6/1955 | Bauling et al. | 536/86 |
| 2,810,162 | 10/1957 | Bechtold et al. | 18/55 |
| 2,854,448 | 9/1958 | Anderson et al. | 536/86 |
| 3,552,400 | 1/1971 | Berger | 536/86 |
| 3,741,703 | 6/1973 | Reynolds | 425/222 |
| 4,047,862 | 9/1977 | Keith | 425/8 |
| 4,111,632 | 9/1978 | Leaver | 425/382 R |
| 4,329,451 | 5/1982 | Zweigle | 536/86 |
| 4,413,016 | 11/1983 | Skoch et al. | 426/454 |
| 4,663,447 | 5/1987 | Yamazaki et al. | 536/76 |
| 4,711,622 | 12/1987 | Schaffner | 425/331 |
| 4,816,298 | 3/1989 | Alderman et al. | 427/421 |
| 4,820,813 | 4/1989 | Schulz | 536/86 |
| 5,167,965 | 12/1992 | Schulz | 424/499 |
| 5,275,773 | 1/1994 | Irie et al. | 264/141 |

FOREIGN PATENT DOCUMENTS

| | | |
|---|---|---|
| 542201 | 6/1957 | Canada . |
| 1239672 | 5/1967 | Germany . |
| 1165824 | 10/1969 | United Kingdom . |

OTHER PUBLICATIONS

Derwent Abstract 36244B/19, J5 4042–419, Japan Geon KK, Sep. 9, 1977.

Derwent Abstract 83–823419/47, J58174–617–A, Asahi Chemical Ind. KK, Apr. 1, 1982.

*Pellet Mill Operators Manual*, American Feed Manufactures Association, Inc. "Equipment Used In The Pelleting Process", Chapter 2, pp. 7–12, believed to have been published in either 1968 or 1982.

Primary Examiner—Ronald W. Griffin

[57] ABSTRACT

This invention is a process for comminuting a cellulose ether which comprises extruding a hydrated cellulose ether through a plurality of orifices, each orifice having a cross-sectional area of from about $7.5 \times 10^{-9}$ m$^2$ to about $1 \times 10^{-6}$ m$^2$, to form an elongated extrudate, and then cutting the elongated extrudate to desired length. The high density cellulose ether product is typically cold water dispersible, non-dusty, and free flowing.

20 Claims, No Drawings

PROCESS FOR COMMINUTING CELLULOSE ETHERS

BACKGROUND OF THE INVENTION

This invention relates to a process for comminuting cellulose ethers.

Cellulose ethers, such as methylcellulose and hydroxypropyl methylcellulose, are used as thickeners in such diverse applications as water-based paints, cements, and foods. Cellulose ethers are prepared by reacting cellulose with alkali to produce an alkali cellulose. The alkali cellulose is reacted with an etherifying agent, such as an alkyl chloride or an epoxide, to form the cellulose ether. Cellulose ethers maintain much of the fibrous structure of the cellulose raw material. As a consequence, the cellulose ethers are generally a low density product due to the bundling of random, non-aligned fibers. The low density makes the packaging and transportation of cellulose ethers cumbersome.

In order to increase the density, most processes attempt to entangle and coalesce the cellulose ether fibers by applying shear to a hydrated cellulose ether below about 30° C. This shear force applied by an attrition mill for instance, results in some densification. However, the settled densities of methylcellulose are usually still below about 0.4 g/cm$^3$. The required increase in shear to obtain densities higher than 0.4 g/cm$^3$ is nearly prohibitive. Also, a dusty cellulose ether product often results, because the mill breaks the cellulose ether particles into very small pieces.

The cellulose ethers are normally dried before they are milled. Unfortunately, the drying times are long due to the large diameter of the cellulose ether product.

A characteristic of the cellulose ethers made by the above process, which may not be desirable in some applications, is that the product is not dispersible in cold water. Non-dispersibility is due to the large surface area and fibrous nature of the cellulose ether. The large surface area leads to the outside particles of the cellulose ether being hydrated before the inside particles when added to water. A gelatinous membrane of hydrated outside particles is thus formed around the inside particles, shielding the inside particles from complete hydration. Thus, cellulose ethers, specifically methylcellulose and hydroxypropyl methylcellulose, form a lumpy mixture when added to cold water due to the incomplete wetting of the individual inside particles. Therefore, it is often necessary to surface-treat the cellulose ether product of these processes with, for example, a dialdehyde such as glyoxal, if dispersion in cold water is desired.

It would be desirable to have a low shear energy process for producing a free flowing cellulose ether product having a high density. If the process for producing a denser cellulose ether could also reduce the drying time and the dust associated with the milling, it would be a great benefit. Furthermore, it would be desirable to reduce the energy required in the process for milling and densification. Also, if the product particles were of a uniform size and dispersible in cold water without surface-treatment, it would be of great value.

SUMMARY OF THE INVENTION

This invention is a process for comminuting a cellulose ether which comprises extruding a hydrated cellulose ether through a plurality of orifices, each orifice having a cross-sectional area of from about 7.5×10$^{-9}$ m$^2$ to about 1×10$^{-6}$ m$^2$, to form an elongated extrudate, and then cutting the elongated extrudate to desired length.

Surprisingly, it has been found that the cellulose ether product of this process has a high density and a small surface area compared to cellulose ether products prepared without the extrusion step. The drying time is minimal in this new process. The milling energy is reduced because it is only necessary to shorten one dimension of the extruded cellulose ether strand. Milling of the other two dimensions is not necessary because these two dimensions are determined by the cross-sectional area of the orifice in the extrusion step. It has also been discovered that often the product particles of this process are of a more uniform size and more dispersible in cold water compared to conventionally dried and milled cellulose ether products.

DETAILED DESCRIPTION OF THE INVENTION

This invention is a process for comminuting a cellulose ether which comprises extruding a hydrated cellulose ether through a plurality of orifices to form an elongated extrudate and then cutting the elongated cellulose ether extrudate.

The cellulose ethers that may be used in this invention are water-soluble. Some typical examples of cellulose ethers that are water-soluble and can be used in the invention are methylcellulose, methylethyl cellulose, hydroxypropyl methylcellulose, hydroxypropyl cellulose, and hydroxyethyl methylcellulose. Mixtures of these cellulose ethers can also be used if the mixture is water-soluble. Preferred cellulose ethers are methylcellulose and hydroxypropyl methylcellulose.

The viscosity and the substitution of the cellulose ether to be used in the invention are not critical as long as the cellulose ether is water-soluble. For example, methylcellulose with a 2 percent aqueous viscosity of about 3 to about 200,000 mPa.s (millipascal-seconds) can be used. The methoxy substitution of the methylcellulose can vary from about 10 percent to about 50 percent by weight. The hydroxypropyl substitution can vary from about 0 percent to about 40 percent by weight. The hydroxyethyl substitution can vary from about 0 percent to about 45 percent by weight.

The aqueous hydrated cellulose ether is a water-soluble cellulose ether, such as those described above, that is hydrated to the extent that it will flow under pressure. The water content of the hydrated cellulose ether is only important in that it should not be so low that the cellulose ether and water mixture will require an excessive amount of pressure, and consequently a high amount of energy, in order to flow. Conversely, the water content of the hydrated cellulose ether should not be so high that the hydrated cellulose ether does not maintain its shape after it is extruded. Generally, the water content of the hydrated cellulose ether is from about 40 to about 75 percent by weight of water. Preferably, the water content of the hydrated cellulose ether is from about 45 to about 65 percent by weight. More preferably, the hydrated cellulose ether has a water content of from about 50 to about 60 percent by weight.

Typically, cellulose ethers are made by the reaction of alkali cellulose and an etherifying agent as described in U.S. Pat. No. 2,160,782, incorporated by reference. The crude product usually contains salts and other impurities. These are removed by washing the cellulose ether product with hot water through a filter. In this process, a wet cake of cellulose ether is formed. This wet cake can be, and preferably is, used as the hydrated cellulose ether to be extruded in the invention.

In general, the shape and size of the orifices fix the cross-sectional shape and size of the extrudate. Although any shape of orifice will suffice, ie. circle, triangle, square, or rectangle, it is preferred that the extrusion of the aqueous hydrated cellulose ether be through equiaxial orifices. Equiaxial orifices are orifices that have approximately equal dimensions in all directions. The size of the orifices, ie. cross-sectional area, should be small enough so that the extruded cellulose ether fibers line up parallel to each other in a tightly formed strand. Thus, the product is densified, meaning that the density of the cellulose ether extrudate is greater than that of unextruded cellulose ether fibers. On the other hand, the cross-sectional area of the orifice should not be so small that an excessive amount of energy must be exerted to press the hydrated cellulose ether through the orifices. Generally, the orifices are of cross-sectional area of about $7.5 \times 10^{-9}$ $m^2$ to about $1 \times 10^{-6}$ $m^2$. Preferably, the orifices have a cross-sectional area of about $1.75 \times 10^{-8}$ $m^2$ to about $7.5 \times 10^{-8}$ $m^2$.

The hydrated cellulose ether to be extruded is temperature sensitive in that at elevated temperatures the cellulose ether expels water and solidifies. When the cellulose ether solidifies, it no longer flows under pressure and cannot be extruded. For this reason, the temperature of the cellulose ether during extrusion is maintained so that the cellulose ether remains hydrated. Typically, a temperature is maintained below 40° C. Preferably, the temperature is maintained at or below 30° C.

The extrusion can be done with any device that applies sufficient pressure to push the hydrated cellulose ether through the extrusion orifices at a temperature which keeps the cellulose ether hydrated. For example, a pump-type extruder, such as a positive displacement piston or a gear pump, can be used. Pump-type extruders are highly preferred in this invention because they are energy efficent and can extrude the hydrated cellulose ether without unduly increasing its temperature. Another example of typical extrusion equipment is a screw-type extruder which advances the hydrated cellulose ether by means of a screw rotating inside a cylinder. Screw-type extruders are not as energy efficient as pump-type extruders and convert much of the energy to heat. This causes the temperature of the cellulose ether to increase and dehydration occurs. Thus, when a screw-type extruder is used, it is generally necessary to use a cooling device to keep the hydrated cellulose ether temperature below about 40° C.

The elongated cellulose ether extrudate is the cellulose ether that has been pressed through the extrusion orifices. Generally, the elongated extrudate is in the form of long, narrow strands. The strands of extrudate have a uniform cross-sectional area that is approximately the same as the extrusion orifices described above.

In order to reduce the strands of cellulose ether into smaller particles, it is necessary to cut the strands. The cutting can be accomplished by using standard equipment known in the art. Typical cutting devices are air-swept impact mills, ball mills, hammer mills, knife grinders, and disk mills. In most cases, the size of the extrusion orifice is selected to fix two of the dimensions of the cellulose ether. Therefore, it is only necessary to cut the strands to shorten the length. Typically, the cellulose ether is cut to a length/ diameter ratio of about 0.5 to about 10. Preferably, the cellulose ether is cut to a length/diameter ratio of about 1 to about 4. This is preferably done in an air-swept impact mill because the other mills, ie. ball mills, have a tendency to overmill the product into fine particles that are dusty. In addition, an air-swept impact mill will dry the cellulose ether, if necessary, by blowing hot air across the mill.

If the cellulose ether extrudate is too wet to be cut with the mills described above, a die-faced cutter may be used. A die-face cutter operates by moving a blade across the stationary die or by moving a die across the stationary blade. Thus, the cellulose ether is cut as it is extruded through the plurality of orifices in the die.

If a die-face cutter is not used for a particular application, it may be necessary to dry the cellulose ether in order to facilitate the cutting. The drying of the elongated extrudate can be accomplished with standard drying equipment and methods known in the art. Typical driers include belt driers and steam tube driers. Belt dryers are preferred because there is a large surface area upon which the cellulose ethers strands can be spread.

Preferably, the cellulose ether is dried to a moisture content such that the cellulose ether is sufficiently brittle for the cellulose ether to be cut. Generally, the cellulose ether is dried to a moisture content of less than 10 percent. However, if a mill is used such as a hot air mill, which blows hot air across the cellulose ether and dries the cellulose ether in the mill, it may only be necessary to dry the cellulose ether to a moisture content of about 25 percent before feeding it to the hot air mill.

The drying of extruded cellulose ether is enhanced by this invention. The small cross-sectional area of the strands results in shorter drying times than cellulose ether products produced without extrusion. The drying time is usually reduced to about 50 percent or less of that required by the conventional processes for producing cellulose ethers.

The cellulose ether products of this invention can be used in a wide variety of applications. They are used as thickeners in adhesives, paints, shampoos, and foods. The cellulose ether products can also be used as dispersing agents in pesticides and fertilizers. Another use for the products is in pharmaceuticals as tablet coatings, such as U.S. Pat. No. 4,001,211, and controlled release formulations.

The cellulose ether product of this invention has certain advantages over cellulose ether products made by different processes. The product is usually denser, above 0.4 $g/cm^3$ settled (tapped) density, less dusty, and flows more freely than the conventional ball milled or attrition milled product. These two features coupled with a somewhat more uniform particle size assists in packaging and shipping the cellulose ether. The cellulose ethers of this process are also usually dispersible in cold water without surface treatment. This makes using the cellulose ethers in cold water applications much more economical.

The process of this invention is more economical than coventional processes because it is not necessary to apply high shear energy to reduce the fibrous surface area and densify the powder. The milling energy is also low because only one dimension of the extruded strand is cut. The drying, if necessary, is enhanced due the small cross-section of the extruded cellulose ether strand.

EXAMPLE 1

A sample of methylcellulose wet cake (METHOCEL™ A4C, The Dow Chemical Company; 27.5–31.5 percent methoxyl content by weight and a viscosity of 400 cps of a 2 percent solution at 20° C.) containing 56.7 percent water by weight is extruded through 250 micrometer holes having a cross-sectional area of $5 \times 10^{-8}$ $m^2$ using a piston pump operating at $2.14 \times 10^4$ kPa. The wet strands are dried to less than 3 percent water by weight and cut with an Alpine 100 UPZ mill (an air swept impact mill having a 0.1 meter diameter fan beater running at speeds up to 17,500 RPM) to form a free-flowing, non-dusty product (sample 1-A) with an unsettled (loose) density of 0.45 g/mL and a settled density of 0.52 g/mL.

The experiment is twice repeated using similar methods and procedures but varying the size of the extrusion holes to 300 micrometer holes having a cross-sectional area of $7\times10^{-8}$ m$^2$ to obtain sample 1-B and 380 micrometer holes having a cross-sectional area of $1.1\times10^{-7}$ m$^2$ to obtain sample 1-C.

EXAMPLE 2

A sample of methylcellulose wet cake (METHOCEL™ K4M, The Dow Chemical Company; 19–25 percent methoxyl content by weight, 4–12 percent hydroxypropyl content by weight, and a viscosity of 4000 cps of a 2 percent solution at 20° C.) containing 56.7 percent water by weight is extruded through 250 micrometer holes having a cross-sectional area of $5\times10^{-8}$ m$^2$ using a piston pump operating at $2.14\times10^4$ kPa. The wet strands are dried to less than 3 percent water by weight and cut with an Alpine 100 UPZ mill to form a free-flowing, non-dusty product (sample 2-A) with a loose density of 0.45 g/mL and a settled density of 0.52 g/mL.

The experiment is twice repeated using similar methods and procedures but varying the size of the extrusion holes to 300 micrometer holes having a cross-sectional area of $7\times10^{-8}$ m$^2$ to obtain sample 2-B and 380 micrometer holes having a cross-sectional area of $1.1\times10^{-7}$ m$^2$ to obtain sample 2-C.

EXAMPLE 3

A sample of methylcellulose wet cake (METHOCEL™ F75M, The Dow Chemical Company; 27–30 percent methoxyl content by weight, 4–7.5 percent hydroxypropyl content by weight, and a viscosity of 75000 cps of a 2 percent solution at 20° C.) containing 51.2% water by weight is extruded through 250 micrometer holes having a cross-sectional area of $5\times10^{-8}$ m$^2$ using a piston pump operating at $2.14\times10^4$ kPa. The wet strands are dried to less than 3% water by weight and cut with an Alpine 100 UPZ mill to form a free-flowing, non-dusty product (sample 2-A) with a loose density of 0.39 g/mL and a settled density of 0.50 g/mL.

The experiment is twice repeated using similar methods and procedures but varying the size of the extrusion holes to 300 micrometer holes having a cross-sectional area of $7\times10^{-8}$ m$^2$ to obtain sample 3-B and 380 micrometer holes having a cross-sectional area of $1.1\times10^{-7}$ m$^2$ to obtain sample 3-C.

EXAMPLE 4

Dispersibility is a quantitative measurement of the compositions dispersion in water, that is generated by measuring the amount of agitation required to completely disperse the composition in water. To measure dispersion, the test apparatus used is a baffled agitated vessel with a variable speed agitator. The vessel is a 4-liter beaker (about 6.1 inch diameter× about 10 inches high). The agitator has two 6-blade turbines with 45° pitched, ½ inch wide blades with a 2.8 inch diameter. One turbine is located at 6.5 inches from the bottom and the other is 2 inches from the bottom. The vessel is also equipped with four ½ inch× 5 inch baffles that are mounted on two metal rings so that they are held about a ⅛ inch from the wall and can be set into the bottom of the vessel. The liquid level is filled to 8 inches from the bottom.

Table I presents a scale of agitation levels which is correlated with bulk fluid velocity. This information is taken from "How to Design Agitators for Designed Process Response", *Chemical Engineering,* pages 102–110, Apr. 26, 1976, which is incorporated by reference in its entirety. The revolutions per minute required in the test apparatus described hereinbefore to achieve the tabulated agitation level has been calculated and is included in Table I.

TABLE I

Process Requirements Set Degree of Agitation for Blending and Motion

| Level of Agitation | Bulk Fluid Velocity ft/min | 1 Gallon RPM |
| --- | --- | --- |
| 1 | 6 | 74 |
| 2 | 12 | 148 |
| 3 | 18 | 221 |
| 4 | 24 | 295 |
| 5 | 30 | 370 |
| 6 | 36 | 440 |
| 7 | 42 | 520 |
| 8 | 48 | 590 |
| 9 | 54 | 664 |
| 10 | 60 | 738 |

Agitation Levels 1 and 2 are characteristic of applications requiring minimum fluid velocities to achieve the process result. Agitation at level 2 will:
(a) blend miscible fluids to uniformity if specific gravity differences are less than 0.1;
(b) blend miscible fluids to uniformity if the viscosity of the most viscous is less than 100 times that of the other;
(c) establish complete fluid-batch control; and
(d) produce a flat, but moving, fluid-batch surface.

Agitation levels 3 to 6 are characteristic of fluid velocities in most chemical process industries agitated batches. Agitation at level 6 will
(a) blend miscible fluids to uniformity if specific gravity differences are less than 0.6;
(b) blend miscible fluids to uniformity if the viscosity of the most viscous is less than 10,000 times that of the other;
(c) suspend trace solids (>2 percent) with settling rates of 2 to 4 ft/min, and
(d) produce surface rippling at lower viscosities.

Agitation levels 7 to 10 are characteristic of applications requiring high fluid velocity for the process result, such as in critical reactors. Agitation at level 10 will:
(a) blend miscible fluids to uniformity if specific gravity differences are less than 1.0;
(b) blend miscible fluids to uniformity if the viscosity of the most viscous is less than 100,000 times that of the other;
(c) suspend trace solids (<2 percent) with settling rates of 4 to 6 ft/min.; and
(d) provide surging surfaces at low viscosities.

The dispersability of samples 1-A to 1-C, 2-A to 2-C, and 3-A to 3-C are measured by determining what level of agitation is required to completely disperse the cellulose ether when added to water at 25° C. The results are indicated in the following Table II.

TABLE II

| Sample Number | Agitation Level |
|---|---|
| 1A | 4 |
| 1B | 4 |
| 1C | 4 |
| 2A | 5 |
| 2B | 5 |
| 2C | 4 |
| 3A | 4 |
| 3B | 4 |
| 3C | 4 |

In comparison, a ball-milled sample of unextruded methylcellulose powder (METHOCEL™ A4C, The Dow Chemical Company; 27.5–31.5 percent methoxyl content by weight and a viscosity of 400 cps of a 2 percent solution at 20° C.) will typically fail to disperse at an agitation level of 10. Similarly, other ball-milled samples of methylcellulose (METHOCEL™ K4M, The Dow Chemical Company; 19–25 percent methoxyl content by weight, 4–12 percent hydroxypropyl content by weight, and a viscosity of 4000 cps of a 2 percent solution at 20° C. and METHOCEL™ F75M, The Dow Chemical Company; 27–30 percent methoxyl content by weight, 4–7.5 percent hydroxypropyl content by weight, and a viscosity of 75000 cps of a 2 percent solution at 20° C.) generally fail to disperse at an agitation level of 10.

What is claimed is:

1. A process for comminuting a water-soluble cellulose ether which comprises:
    (a) extruding an aqueous hydrated cellulose ether of water-soluble cellulose ether through a plurality of orifices of cross-sectional area of about $7.5 \times 10^{-9}$ m$^2$ to about $1 \times 10^{-6}$ m$^2$ to form an elongated cellulose ether extrudate wherein a multiplicity of fibers are lined up parallel to each other and then;
    (b) cutting the elongated cellulose ether extrudate.

2. The process of claim 1, wherein the aqueous hydrated cellulose ether contains about 45–65 percent water by weight.

3. The process of claim 2, wherein the cellulose ether is methylcellulose or hydroxypropyl methylcellulose.

4. The process of claim 1, wherein the cross-sectional area of the orifice is between about $1.75 \times 10^{-8}$ m$^2$ to about $7.5 \times 10^{-8}$ m$^2$.

5. The process of claim 1, wherein in step (a) the temperature of the hydrated cellulose ether is about 30 degrees Celsius or below.

6. The process of claim 1, wherein the elongated cellulose ether extrudate is cut to a length/diameter ratio of about 1 to about 4.

7. The process of claim 1, wherein in step (a) the aqueous hydrated cellulose ether is extruded with a positive displacement pump.

8. The process of claim 1, wherein in step (b) the elongated cellulose ether extrudate is cut with a die-face cutter.

9. The process of claim 1, wherein in step (b) the elongated cellulose ether extrudate is cut with an air-swept impact mill, a ball mill, a hammer mill, knife grinder, or a disk mill.

10. The process of claim 9, wherein the elongated cellulose ether extrudate is dried before it is cut.

11. A cellulose ether product made by:
    (a) extruding an aqueous hydrated cellulose ether of water-soluble cellulose ether through a plurality of orifices of cross-sectional area of about $7.5 \times 10$ m$^2$ to about $1 \times 10^{-6}$ m$^2$ to form an elongated cellulose ether extrudate wherein a multiplicity of fibers are lined up parallel to each other and then;
    (b) cutting the elongated cellulose ether extrudate;
    wherein the cellulose ether product has a settled density of greater than 0.4 g/cm$^3$.

12. The product of claim 11, wherein the aqueous hydrated cellulose ether contains about 45–65 percent water by weight.

13. The product of claim 12, wherein the cellulose ether is methylcellulose or hydroxypropyl methylcellulose.

14. The product of claim 11, wherein the cross-sectional area of the orifice is between about $1.75 \times 10^{-8}$ m$^2$ to about $7.5 \times 10^{-8}$ m$^2$.

15. The product of claim 11, wherein in step (a) the temperature of the hydrated cellulose ether is about 30 degrees Celsius or below.

16. The product of claim 11, wherein the elongated cellulose ether extrudate is cut to a length/diameter ratio of about 1 to about 4.

17. The product of claim 11, wherein in step (a) the aqueous hydrated cellulose ether is extruded with a positive displacement pump.

18. The product of claim 11, wherein in step (b) the elongated cellulose ether extrudate is cut with a die-face cutter.

19. The product of claim 11, wherein in step (b) the elongated cellulose ether extrudate is cut with an air-swept impact mill, a ball mill, a hammer mill, knife grinder, or a disk mill.

20. The product of claim 19, wherein the elongated cellulose ether extrudate is dried before it is cut.

* * * * *